3,337,425
EXTRACTION DISTILLATION OF OLEFIN OXIDES WITH A HYDROCARBON SOLVENT
Robert C. Binning, St. Louis, and Glen F. Crum, Kirkwood, Mo., assignors to Monsanto Company, a corporation of Delaware
Filed Feb. 12, 1964, Ser. No. 344,209
11 Claims. (Cl. 203—52)

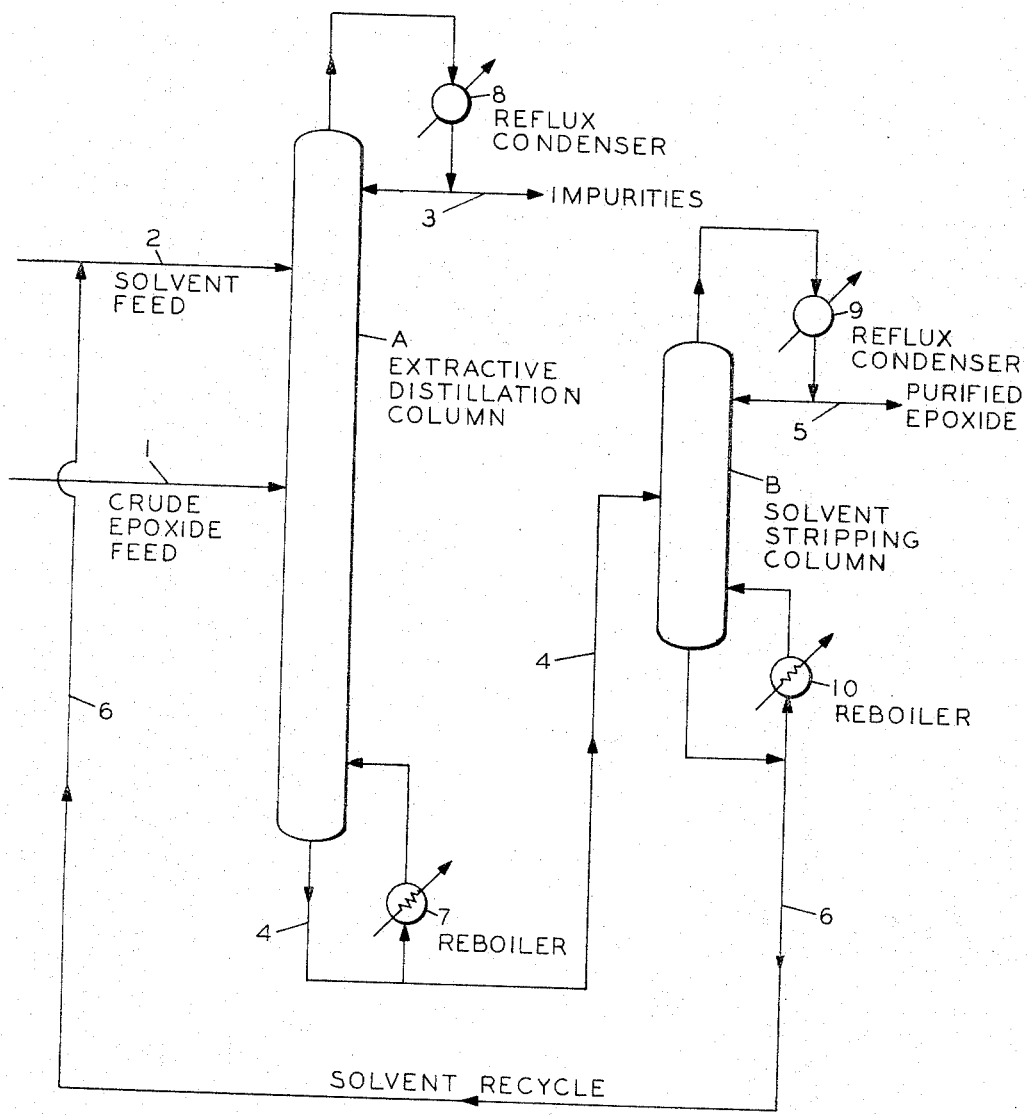

This invention relates to a process for the recovery and purification of olefin oxides.

More particularly, the present invention relates to the recovery of olefin oxides from crude mixtures of oxygenated compounds and olefin oxides by an extractive distillation process.

The present invention is especially suited to the recovery from crude mixtures of oxygenated compounds of olefin oxides having from 3 to 18 carbon atoms. Of particular interest and utility is the recovery and purification of propylene oxide.

In the direct oxidation of ethylenically unsaturated compounds with molecular oxygen in the liquid phase to produce epoxides, a complex mixture of oxygenated products is formed. For example, in the molecular oxygen oxidation of propylene in the liquid phase at least 45 different products have been identified as being present in the system. The products of these oxidations include acids, alcohols, aldehydes, ketones, esters, etc., in addition to the olefin oxide. The various products are then separated by various refining trains. In order to recover and purify the desired epoxide, a number of separation operations are required. The various separation steps result in a number of crude fractions containing oxygenated impurities having similar boiling points. One of these fractions contains the desired epoxide and impurities having relatively similar boiling points which renders separation and purification of the epoxide infeasible by conventional distillation techniques. For example, in the recovery of propylene oxide a crude mixture of propylene oxide and methyl formate is obtained; this stream may also contain acetaldehyde. The propylene oxide and methyl formate components boil within 5° C. of each other, hence cannot feasibly be separated by conventional distillation.

It has been proposed in prior art processes to separate propylene oxide from crude mixtures containing methyl formate or methyl formate and acetaldehyde by various means. For example, in U.S. Patents 2,550,847 and 2,622,060 it is suggested to separate propylene oxide from methyl formate by use of aqueous inorganic saponifying agents to saponify methyl formate. The processes described in these patents are disadvantageous in that use of the saponifying agent gives rise to resinified products and salts which must be separated and discarded. It is necessary, therefore, to continuously add fresh saponifying material which materially increases control requirements and cost of operation. Moreover, the use of aqueous materials in such process requires phase separation as between the propylene oxide and the aqueous phase. To accomplish phase separation it is sometimes necessary to use decanters which add to apparatus and operational requirements. A further disadvantage in using aqueous reagents is the increased possibility of hydrolyzing the propylene oxide to propylene glycol.

Another prior art method for separating propylene oxide from methyl formate is described in U.S. Patent 3,071,601. In this method reliance is placed upon the use of azeotropic distillation separation wherein an azeotrope-former removes methyl formate overhead. A disadvantage of this process is that the azeotrope-former cannot be recycled to the azeotropic distillation column for continuous use until the azeotropic mixture has been subjected to some additional treatment to remove the methyl formate. A typical treatment necessary to remove methyl formate involves solvent extraction of the azeotrope with water. However, use of water is disadvantageous since the azeotrope-former becomes saturated with water which, when recycled to the azeotropic distillation column, interferes with operation of the column by decreasing the flood point thereof, by creating fluctuations in temperature and by tending to concentrate water in the column, thus forming two phases with the azeotrope-former on one tray. Additionally, when the azeotrope-former containing water is recycled to the column the propylene oxide therein is subject to hydrolysis to propylene glycol by the water. Another disadvantage in treating the azeotropic mixture to water extraction is that methyl formate is hydrolyzed to formic acid which when recycled to the column is highly corrosive thereof. If an extractive solvent other than water is used to separate methyl formate from the azeotrope-former, the foregoing problems still must be avoided. In addition, the extractive solvent must be relatively insoluble with the azeotrope-former.

Still a further disadvantage of using an azeotrope-former such as n-pentane is that the concentration of n-pentane used in the column must be rigorously controlled, since its boiling point is only 1° C. higher than that of propylene oxide. If too little n-pentane is used it will not entrain methyl formate; if too much is used n-pentane will be removed with the propylene oxide.

Another prior art method for treating crude mixtures of oxygenated products containing propylene oxide is described in U.S. Patent 3,039,940. The procedure described in that patent involves the extractive distillation separation of propylene oxide and methylal wherein the distillate contains a higher proportion of propylene oxide than the feed stream entering the extractive distillation column, while withdrawing as a bottoms stream the extractive distillation solvent containing most of the methylal. The procedure described in this patent is inadequate to provide, in fact is incapable of providing, a clean separation and purification of propylene oxide because methyl formate, which is produced in the oxidation process described in the patent, boils within about 3° C. of propylene oxide (1,2-). Consequently, the overhead vapors contain substantially the same proportion of methyl formate impurity relative to propylene oxide as does the feed stream to the extractive distillation column. Hence, methyl formate is not, and cannot be, separated from propylene oxide and methylal, which boils at more than 7° C. higher than propylene oxide, by the process of the above patent. Moreover, although at least 45 different oxygenated products resulting from liquid phase oxidations have been identified by applicants, using the most refined analytical apparatus and techniques, methylal has never been identified as a product of these reactions.

It is, therefore, an object of the present invention to provide a simple and economic method for the recovery and purification of olefin oxides from crude mixtures of oxygenated compounds and said olefin oxides, which method is superior to prior art methods, e.g., in avoiding such difficulties as enumerated above.

It is a further object of the present invention to provide a process for the separation of olefin oxides having from 3 to 18 carbon atoms from crude mixtures thereof together with oxygenated compounds boiling within 5° C. of said olefin oxides.

A particular object of the present invention is the separation and recovery of purified propylene oxide from a crude mixture thereof together with methyl formate or methyl formate and acetaldehyde.

These and other objects of the invention will become apparent as the description proceeds.

The invention will be better understood by reference to the accompanying figure which is a schematic drawing of the apparatus in which the instant process is performed.

In accordance with the present invention it has been discovered that olefin oxides may be recovered from crude mixtures thereof together with close-boiling oxygenated products by extractively distilling said crude mixture in the presence of certain olefinic, naphthenic and/or aromatic hydrocarbons as extractive solvents. In particular, it has been found that oxygenated impurities boiling within 5° C. of olefin oxides may be separated from said olefin oxides by use of extractive distillation using olefinic, naphthenic and/or aromatic hydrocarbons having boiling points of at least 35° C. above those of said impurities as the extractive solvent. In general, the hydrocarbons utilized herein as extractive solvents should have boiling points of at least 67° C.

In a particularly suitable embodiment of this invention a crude fraction containing propylene oxide and methyl formate resulting from the liquid phase oxidation of propylene with molecular oxygen is subjected to extractive distillation using pure 1-heptene as extractive solvent. The methyl formate is distilled overhead while the 1-heptene containing propylene oxide is removed as bottoms. The propylene oxide is readily stripped from the 1-heptene in very pure form and the 1-heptene is continuously recycled to the extractive distillation zone for reuse. Although crude mixtures containing propylene oxide as described in this embodiment commonly contain acetaldehyde in addition to methyl formate, the impurity methylal, reportedly formed in vapor phase oxidations, has never been detected even after extensive refining and analyses of reaction products resulting from liquid phase oxidations referred to herein.

In another preferred embodiment, a cracked wax olefin fraction boiling between 75° C. and 95° C. may conveniently be substituted for the 1-heptene described above.

In general, the present invention contemplates the separation and recovery of any olefin oxide having from 3 to 18 carbon atoms from crude mixtures containing the same together with oxygenated impurities boiling within 5° C. of said olefin oxide. In this manner the epoxides of such olefins as the following are recovered: propylene, butenes, pentenes, hexenes, heptenes, octenes, nonenes, dodecenes, pentadecenes, heptadecenes and octadecenes. Of particular interest, utility and convenience is the separation of epoxides having from 3 to 8 carbon atoms. Included are the epoxides of alkyl-substituted olefins such as 2-methyl-1-butene, 2-methyl-2-butene, 4-methyl-2-pentene, 2-ethyl-3-methyl-1-butene, 2,3-dimethyl-2-butene and 2-methyl-2-pentene.

Epoxides of the following olefinic compounds are also recoverable according to this invention: isobutylene, conjugated and unconjugated dienes including the butadienes, e.g. 1,3-butadiene, isoprene, other pentadienes, hexadienes, heptadienes, octadienes, decadienes, dodecadienes, styrene and octadecadienes.

Olefinic hydrocarbons suitable for use as extractive solvents herein include both individual olefins having from 6 to 18 carbon atoms and mixtures thereof. Examplary olefins include straight and branched chain olefins such as 2-hexene; heptenes, e.g., 1- and 2-heptene; octenes, e.g., 1-octene; nonenes, e.g., 2-nonene; decenes, e.g., 1-decene; undecenes, dodecenes, tridecenes, hexadecenes and octadecenes; 2-methyl-2-pentene, 2,3-dimethyl-2-butene, 2,3,3-trimethyl butene and the like; cycloethylenic hydrocarbons, e.g., cyclohexene and various alkylcyclohexenes, preferably those having from 1 to 6 carbon atoms in the alkyl group, e.g., methylcyclohexene, propylcyclohexene, hexylcyclohexene, 1,3,5-trimethylcyclohexene, 2,3,4-triethylcyclohexene, 1,2,5-tributylcyclohexene and the like; and various indenes, e.g., indene, hydrindene, isoindene and the like.

Representative naphthenes include monoalkylcyclopentanes, dialkylcyclopentanes, trialkylcyclopentanes, mono-, di- and trialkylcyclohexanes, the alkyl groups of which preferably contain from 1 to 6 carbon atoms, including the methyl, ethyl, propyl, butyl, amyl and hexyl-substituted products; bicyclohexane, decalin, dicyclohexyl and phenylcyclohexane.

Representative aromatic hydrocarbons suitable as extractive solvents herein include benzene, alkylbenzenes preferably those having from 1 to 9 carbon atoms in the alkyl groups which can be located in any and/or all positions on the benzene ring, e.g., toluene, o, m and p-xylenes, ethylbenzene, propylbenzene, cumene, pseudocumene, mesitylene, o, m and p-cymenes, durene, phenylbutanes, phenylpentanes, phenylnonanes, biphenyl, naphthalene and the like.

In addition to individual hydrocarbons described above, mixtures of such hydrocarbons are suitable herein. For example, various naphthas are suitable. Typical naphthas include selected fractions of straight-run gasolines and kerosenes. Other naphthas include selected fractions of polygas and other low molecular weight propylene polymers (e.g., propylene tetramers and pentamers), as well as selected fractions of naphthas obtained from thermal cracking and catalytic cracking of gas oils.

Still other naphthas include selected fractions of Udex extracts (derived from solvent extractions using, e.g., diethylene glycol) from various reforming operations. For example, a particularly suitable naphtha useful as extracting solvent in the extractive distillation separation of propylene oxide from methyl formate is a $C_{10}$–$C_{12}$ fraction of Udex extract. The naphthas used herein may contain small amounts of paraffins derived from reforming operations without adverse effects.

The selection of a particular hydrocarbon extractive solvent as described herein will depend primarily upon the boiling points of the particular epoxide and oxygenated impurities associated therewith as described supra.

As noted above, the hydrocarbons suitable as extractants herein are those having a boiling point at least 35° C. higher than the boiling point of the particular impurity(s) boiling within 5° C. of the olefin oxide in a crude mixture containing oxygenated impurities. These hydrocarbons, moreover, should boil at no less than 67° C. In general the upper boiling point of hydrocarbon solvent used is limited only by practical engineering considerations. A preferred boiling point range for hydrocarbons used herein is from 67° C. to 250° C.

Use of the extractive solvents as defined herein in the extractive distillation separation of olefin oxides has numerous desirable features, e.g., increased separation enhancement, ease of separation of the olefin oxide from the extractive solvent, freedom from corrosion problems and economy.

The extractive distillation process of the present invention may be performed either in batch or continuous operation. Preferably, from a standpoint of commercial operation, the process is performed continuously.

In a typical operation, the crude feed containing the olefin oxide to be separated and purified and oxygenated impurities associated therewith is fed to an intermediate point of the extractive distillation column. The hydrocarbon extractive solvent is fed to a higher region of the column. The column is heated by means of a reboiler at the base thereof. The overhead vapors from the column comprise essentially all of the oxygenated impurities boiling within 5° C. of the olefin oxide. These vapors are condensed and refluxed to the column while a portion is removed as distillate product. Bottoms from the column comprising essentially the hydrocarbon extractive solvent containing the olefin oxide are withdrawn through a reboiler and fed to an olefin oxide refining column where the olefin oxide is stripped from the extractive solvent and taken overhead in purified form. The extractive solvent is removed as bottoms from the olefin oxide refining column and continuously recycled to the extractive distillation column.

The ratios of hydrocarbon to crude feed are not critical herein and may be varied considerably. For example, ratios of 1:1 to 15:1 may suitably be used, although ratios within the range of 5:1 to 10:1 are preferred.

Temperatures and pressures used in the extractive distillation column may be varied over wide ranges. In general, temperatures at the reboiler should be such that the olefin oxide content in the extractive solvent withdrawn as bottoms will be maintained at a maximum. Preferably, the column is operated at atmospheric pressures although subatmospheric and superatmospheric pressures may also be used.

The following examples illustrate specific embodiments of the present invention, reference being made to the accompanying drawing; the distillation column pressures in these examples are atmospheric except where otherwise indicated:

Example 1

A crude mixture containing approximately 78% by weight of 1,2-propylene oxide, 13% of methyl formate, 9% acetaldehyde and traces of water, methanol and unknowns are introduced through line 1 at the rate of 409 grams per hour at the 25th tray from the top of a 2 inch diameter Oldershaw distillation column, A, containing 50 trays, while 6000 grams per hour of 1-heptene are simultaneously introduced at the 5th tray from the top of the column through line 2. Heat is supplied to the column so that the temperature is maintained at about 34° C. at the top of the column, at about 43° C. at the crude mixture feed tray and at about 71° C. at the reboiler, 7. The reflux ratio is kept at about 40 to 1 through condenser 8.

The overhead product taken through line 3 consists of about 58% by weight of methyl formate, 39% by weight of acetaldehyde and 3% propylene oxide. Bottoms from the extractive distillation column containing only 1-heptene and propylene oxide (of substantially the same quantity of propylene oxide in the crude feed) are fed simultaneously through line 4 to the 15th tray from the top of another Oldershaw column, B, of 2 inch diameter and containing 25 total trays. This column is operated at a reflux ratio of 7.5 to 1 through condenser 9. Heat is supplied to the reboiler, 10, to maintain an overhead temperature of 35° C., a feed tray temperature of 85° C. and a reboiler temperature of 94° C. The overhead product taken through line 5 consists of 99.9+% by weight of 1,2-propylene oxide. The bottoms product of this solvent stripping column is continuously removed through line 6 and recycled via line 2 back to the solvent feed tray of the extractive distillation column. Trace impurities are removed in the overhead product of each of these columns, utilizing the same apparatus described in Example 1. Trace impurities in the following examples are removed in the same manner.

Example 2

A crude mixture containing approximately 78% by weight of 1,2-propylene oxide, 13% of methyl formate, 9% acetaldehyde and traces of water, methanol and unknowns is introduced at the rate of 409 grams per hour at the 30th tray from the top of a 2 inch diameter Oldershaw distillation column containing 55 trays, while 6000 grams per hour of methylcyclohexane as extractant are simultaneously introduced at the 5th tray from the top of the column. Heat is supplied to the column so that the temperature is maintained at about 38° C. at the top of the column, at about 50° C. at the crude mixture feed tray, and at about 79° C. at the reboiler. The reflux ratio is kept at about 44 to 1.

The overhead product contains about 58% by weight of methyl formate, 39% by weight of acetaldehyde and 3% propylene oxide. Bottoms from the extractive distillation column containing only methylcyclohexane and propylene oxide (of substantially the same quantity of propylene oxide in the crude feed) are fed simultaneously to the 15th tray from the top of another Oldershaw column of 2 inch diameter and containing 25 total trays. This column is operated at a reflux ratio of 6.5 to 1. Heat is supplied to the reboiler to maintain an overhead temperature of 35° C., a feed tray temperature of 92° C. and a reboiler temperature of 101° C. The overhead product consists essentially of 99.9+% by weight of 1,2-propylene oxide. The bottoms product of this solvent stripping column is continuously recycled back to the solvent feed tray of the extractive distillation column.

Example 3

A crude mixture containing approximately 85% by weight of isobutylene oxide, 5% of ethyl formate, 10% propionaldehyde and traces of unknowns is introduced at the rate of 420 grams per hour at the 25th tray from the top of a 2 inch diameter Oldershaw distillation column containing 50 trays, while 6100 grams per hour of a catalytic naphtha (B.P. 120°–130° C.) containing by weight about 42% olefins, 10% naphthenes, 5% aromatics and the balance paraffins are simultaneously introduced at the 5th tray from the top of the column. Heat is supplied to the column so that the temperature is maintained at about 60° C. at the top of the column, at about 72° C. at the crude mixture feed tray, and at about 105° C. at the reboiler. The reflux ratio is kept at about 45 to 1.

The overhead product contains about 32% by weight of ethyl formate, 64% by weight of propionaldehyde and 4% isobutylene oxide. Bottoms from the extractive distillation column containing only the catalytic naphtha and isobutylene oxide (of substantially the same quantity of isobutylene oxide in the crude feed) are fed simultaneously to the 15th tray from the top of another Oldershaw column of 2 inch diameter and containing 25 total trays. This column is operated at a reflux ratio of 5 to 1. Heat is supplied to the reboiler to maintain an overhead temperature of 53° C., a feed tray temperature of 112° C. and a reboiler temperature of 126° C. The overhead product consists essentially of 99.9+% by weight of isobutylene oxide. The bottoms product of this solvent stripping column is continuously recycled back to the solvent feed tray of the extractive distillation column.

Example 4

A crude mixture containing approximately 78% by weight of 1,2-propylene oxide, 13% of methyl formate, 9% acetaldehyde and traces of water, methanol and unknowns is introduced at the rate of 409 grams per hour at the 35th tray from the top of a 2 inch diameter Oldershaw distillation column containing 60 trays, while 6000 grams per hour of benzene are simultaneously introduced at the 5th tray from the top of the column. Heat is supplied to the column so that the temperature is maintained at about 34° C. at the top of the column, at about 38° C. at the crude mixture feed tray, and at about 62° C. at the reboiler. The reflux ratio is kept at about 50 to 1.

The overhead product contains about 58% by weight of methyl formate, 39% by weight of acetaldehyde and 3% propylene oxide. Bottoms from the extractive distillation column containing only benzene and propylene oxide (of substantially the same quantity of propylene oxide in the crude feed) are fed simultaneously to the 20th tray from the top of another Oldershaw column of 2 inch diameter and containing 35 total trays. This column is operated at a reflux ratio of 8.5 to 1. Heat is supplied to the reboiler to maintain an overhead temperature of 35° C., a feed tray temperature of 74° C. and a reboiler temperature of 82° C. The overhead product consists essentially of 99.9+% by weight of 1,2-propylene oxide. The bottoms product of this solvent stripping column is continuously recycled back to the solvent feed tray of the extractive distillation column.

Example 5

A crude mixture containing approximately 90% by weight of octylene oxide, 5% octanal, 2% 4-octanone, 3% methyl enanthate and traces of unknowns is introduced at the rate of 150 grams per hour at the 35th tray from the top of a 2 inch diameter Oldershaw distillation column containing 60 trays, while 3100 grams per hour of a Udex extract boiling between 220° C. and 230° C. and containing approximately 98° by weight aromatics and 2% paraffins are simultaneously introduced at the 5th tray from the top of the column. Heat is supplied to the column so that the temperature is maintained at about 181° C. at the top of the column, at about 194° C. at the crude mixture feed tray, and at about 220° C. at the reboiler. The reflux ratio is kept at about 55 to 1.

The overhead product contains about 44% by weight octanal, 26% by weight methyl enanthate, 18% 4-octanone and 12% octylene oxide. Bottoms from the extractive distillation column containing only the Udex extract solvent and octylene oxide (of substantially the same quantity of octylene oxide in the crude feed) are fed simultaneously to the 15th tray from the top of another Oldershaw column of 2 inch diameter containing 25 total trays. This column is operated at pressures of 400 mm. Hg at the top and 435 mm. Hg at the bottom and uses a reflux ratio of 5.5 to 1. Heat is supplied to the reboiler to maintain an overhead temperature of 148° C., a feed tray temperature of 182° C. and a reboiler temperature of 201° C. The overhead product consists essentially of 99.9+% by weight of octylene oxide. The bottoms product of this solvent stripping column is continuously recycled back to the solvent feed tray of the extractive distillation column.

Example 6

A crude mixture containing approximately 78% by weight of 1,2-propylene oxide, 13% of methyl formate, 9% acetaldehyde and traces of water, methanol and unknowns are introduced at the rate of 410 grams per hour at the 30th tray from the top of a 2 inch diameter Oldershaw distillation column containing 55 trays, while 6000 grams per hour of a $C_7$–$C_8$ cracked wax olefin fraction (B.P. 75°–95° C.) are simultaneously introduced at the 5th tray from the top of the column. Heat is supplied to the column so that the temperature is maintained at about 34° C. at the top of the column, at about 43° C. at the crude mixture feed tray, and at about 65° C. at the reboiler. The reflux ratio is about 45 to 1.

The overhead product consists of about 57% by weight of methyl formate, 38% by weight of acetaldehyde and 4% propylene oxide. Bottoms from the extractive distillation column containing only the cracked wax olefin fraction and propylene oxide (of substantially the same quantity of propylene oxide in the crude feed) are fed simultaneously to the 15th tray from the top of another Oldershaw column of 2 inch diameter and containing 25 total trays. This column is operated at a reflux ratio of 8 to 1. Heat is supplied to the reboiler to maintain an overhead temperature of 35° C., a feed tray temperature of 74° C. and a reboiler temperature of 82° C. The overhead product consists of 99.9+% by weight of 1,2-propylene oxide. The bottoms product of this solvent stripping column is continuously recycled back to the solvent feed tray of the extractive distillation column. Trace impurities are removed in the overhead product of each of these columns.

Example 7

A crude mixture containing approximately 90% by weight of styrene oxide, 5% of phenyl acetate, 5% phenylacetaldehyde and traces of unknows is introduced at the rate of 160 grams per hour at the 25th tray from the top of a 2 inch diameter Oldershaw distillation column containing 50 trays, while 3000 grams per hour of 1-tridecene are simultaneously introduced at the 5th tray from the top of the column. Heat is supplied to the column so that the temperature is maintained at about 169° C. at the top of the column, at about 182° C. at the crude mixture feed tray and at about 200° C. at the reboiler. Pressures in this column are 300 mm. Hg at the top and 375 mm. Hg at the bottom. The reflux ratio is kept at about 40 to 1.

The overheat product contains about 47% by weight phenyl acetate, 47% by weight phenylacetaldehyde and 6% styrene oxide. Bottoms from the extractive distillation column containing only 1 tridecene and styrene oxide (of substantially the same quantity of styrene oxide in the crude feed) are fed simultaneously to the 15th tray from the top of another Oldershaw column of 2 inch diameter and containing 25 total trays. This column is operated at a reflux ratio of 6.5 to 1 and pressures of 350 mm. Hg at the top and 385 mm. Hg at the bottom. Heat is supplied to the reboiler to maintain an overhead temperature of 163° C., a feed tray temperature of 193° C. and a reboiler temperature of 209° C. The overhead product consists essentially of 99.9+% by weight of styrene oxide. The bottoms product of this solvent stripping column is continuously recycled back to the solvent feed tray of the extractive distillation column.

Example 8

A crude mixture containing approximately 94% by weight of butadiene monoxide, 3% methacrolein, 3% methanal and traces of unknowns is introduced at the rate of 260 grams per hour at the 25th tray from the top of a 2 inch diameter Oldershaw distillation column containing 50 trays, while 5000 grams per hour of 2-octene are simultaneously introduced at the 5th tray from the top of the column. Heat is supplied to the column so that the temperature is maintained at about 74° C. at the top of the column, at about 85° C. at the crude mixture feed tray, and at about 109° C. at the reboiler. The reflux ratio is kept at about 45 to 1.

The overhead product contains about 43% by weight methacrolein, 43% by weight methanal and 13% butadiene monoxide. Bottoms from the extractive distillation column containing only 2-octene and butadiene monoxide (of substantially the same quantity of butadiene monoxide in the crude feed) are fed simultaneously to the 15th tray from the top of another Oldershaw column of 2 inch diameter and containing 25 total trays. This column is operated at a reflux ratio of 6.5 to 1. Heat is supplied to the reboiler to maintain an overhead temperature of 67° C., a feed tray temperature of 115° C., and a reboiler temperature of 126° C. The overhead product consists essentially of 99.9+% by weight of butadiene monoxide. The bottoms product of this solvent stripping column is continuously recycled back to the solvent feed tray of the extractive distillation column.

Example 9

A crude mixture containing approximately 94% by weight of butadiene monoxide, 3% methacrolein, 3% methanal and traces of unknowns is introduced at the rate of 100 grams per hour at the 30th tray from the top of a 2 inch diameter Oldershaw distillation column containing 55 trays, while 5000 grams per hour of 1,2-dimethylcyclohexene are simultaneously introduced at the 5th tray from the top of the column. Heat is supplied to the column so that the temperature is maintained at about 74° C. at the top of the column, at about 85° C. at the crude mixture feed tray, and at about 109° C. at the reboiler. The reflux ratio is kept at about 45 to 1.

The overhead product contains about 41% by weight methacrolein, 41% by weight methanal and 18% butadiene monoxide. Bottoms from the extractive distillation column containing only 1,2-dimethylcyclohexene and butadiene monoxide (of substantially the same quantity of butadiene monoxide in the crude feed) are fed simultaneously to the 15th tray from the top of another Oldershaw column of 2 inch diameter and containing 25 total trays.

This column is operated at a reflux ratio of 6.5 to 1. Heat is supplied to the reboiler to maintain an overhead temperature of 67° C., a feed tray temperature of 115° C. and a reboiler temperature of 127° C. The overhead product consists essentially of 99.9+% by weight of butadiene monoxide. The bottoms product of this solvent stripping column is continuously recycled back to the solvent feed tray of the extractive distillation column.

*Example 10*

A crude mixture containing approximately 94% by weight of butadiene monoxide, 3% methacrolein, 3% methanal and traces of unknowns is introduced at the rate of 275 grams per hour at the 40th tray from the top of a 2 inch diameter Oldershaw distillation column containing 65 trays, while 5000 grams per hour of toluene are simultaneously introduced at the 5th tray from the top of the column. Heat is supplied to the column so that the temperature is maintained at about 71° C. at the top of the column, at about 76° C. at the crude mixture feed tray, and at about 97° C. at the reboiler. The reflux ratio is kept at about 60 to 1.

The overhead product contains about 43% by weight methacrolein, 43% by weight methanal and 15% butadiene monoxide. Bottoms from the extractive distillation column containing only toluene and butadiene monoxide (of substantially the same quantity of butadiene monoxide in the crude feed) are fed simultaneously to the 20th tray from the top of another Oldershaw column of 2 inch diameter and containing 35 total trays. This column is operated at a reflux ratio of 8.0 to 1. Heat is supplied to the reboiler to maintain an overhead temperature of 67° C., a feed tray temperature of 101° C. and a reboiler temperature of 112° C. The overhead product consists essentially of 99.9+% by weight of butadiene monoxide. The bottoms product of this solvent stripping column is continuously recycled back to the solvent feed tray of the extractive distillation column.

*Example 11*

A crude mixture containing approximately 78% by weight of 1,2-propylene oxide, 13% of methyl formate, 9% acetaldehyde and traces of water, methanol and unknowns are introduced at the rate of 410 grams per hour at the 30th tray from the top of a 2 inch diameter Oldershaw distillation column containing 55 trays, while 6000 grams per hour of a virgin naphtha (B.P. 75°–95° C.) containing by weight approximately 60% naphthenes, 3% aromatics and the balance paraffins are simultaneously introduced at the 5th tray from the top of the column. Heat is supplied to the column so that the temperature is maintained at about 34° C. at the top of the column, at about 43° C. at the crude mixture feed tray, and at about 65° C. at the reboiler. The reflux ratio is kept at about 45 to 1.

The overhead product consists of about 57% by weight of methyl formate, 38% by weight of acetaldehyde and 4% propylene oxide. Bottoms from the extractive distillation column containing only the naphtha solvent and propylene oxide (of substantially the same quantity of propylene oxide in the crude feed) are fed simultaneously to the 15th tray from the top of another Oldershaw column of 2 inch diameter and containing 25 total trays. This column is operated at a reflux ratio of 8 to 1. Heat is supplied to the reboiler to maintain an overhead temperature of 35° C., a feed tray temperature of 74° C. and a reboiler temperature of 82° C. The overhead product consists of 99.9+% by weight of 1,2-propylene oxide. The bottoms product of this solvent stripping column was continuously recycled back to the solvent feed tray of the extractive distillation column. Trace impurities were removed in the overhead product of each of these columns.

*Example 12*

A crude mixture containing approximately 90% by weight of styrene oxide, 5% of phenyl acetate, 5% phenylacetaldehyde and traces of unknowns is introduced at the rate of 170 grams per hour at the 30th tray from the top of a 2 inch diameter Oldershaw distillation column containing 55 trays, while 3000 grams per hour of heptylcyclohexane are simultaneously introduced at the 5th tray from the top of the column. Heat is supplied to the column so that the temperature is maintained at about 172° C. at the top of the column, at about 185° C. at the crude mixture fed tray, and at about 207° C. at the reboiler. The reflux ratio is kept at about 40 to 1. Pressures in this column are 300 mm. Hg at the top and 375 mm. Hg at the bottom.

The overhead product contains about 45% by weight phenyl acetate, 45% by weight phenylacetaldehyde and 10% styrene oxide. Bottoms from the extractive distillation column containing only heptylcyclohexane and styrene oxide (of substantially the same quantity of styrene oxide in the crude feed) are fed simultaneously to the 15th tray from the top of another Oldershaw column of 2 inch diameter and containing 25 total trays. This column is operated at a reflux ratio of 6.0 to 1 and pressures of 350 mm. Hg at the top and 385 mm. Hg at the bottom. Heat is supplied to the reboiler to maintain an overhead temperature of 163° C., a feed tray temperature of 198° C. and a reboiler temperature of 215° C. The overhead product consists essentially of 99.9+% by weight of styrene oxide. The bottoms product of this solvent stripping column is continuously recycled back to the solvent feed tray of the extractive distillation column.

*Example 13*

A crude mixture containing aproximately 90% by weight of styrene oxide, 5% of phenyl acetate, 5% phenylacetaldehyde and traces of unknowns is introduced at the rate of 180 grams per hour at the 35th tray from the top of a 2 inch diameter Oldershaw distillation column containing 60 trays, while 3000 grams per hour of pentamethylbenzene are simultaneously introduced at the 5th tray from the top of the column. Heat is supplied to the column so that the temperature is maintained at about 166° C. at the top of the column, at about 179° C. at the crude mixture feed tray, and at about 199° C. at the reboiler. The reflux ratio is kept at about 50 to 1. Pressures in this column are 300 mm. Hg at the top and 390 mm. Hg at the bottom.

The overhead product contains about 45% by weight phenyl acetate, 45% by weight phenylacetaldehyde and 10% styrene oxide. Bottoms from the extractive distillation column containing only pentamethylbenzene and styrene oxide (of substantially the same quantity of styrene oxide in the crude feed) are fed simultaneously to the 15th tray from the top of another Oldershaw column of 2 inch diameter and containing 25 total trays. This column is operated at a reflux ratio of 6.5 to 1 and pressures of 350 mm. Hg at the top and 385 mm. Hg at the bottom. Heat is supplied to the reboiler to maintain an overhead temperature of 163° C., a feed tray temperature of 190° C. and a reboiler temperature of 205° C. The overhead product consists essentially of 99.9+% by weight of styrene oxide. The bottoms product of this solvent stripping column is continuously recycled back to the solvent feed tray of the extractive distillation column.

Various other modifications of this invention will occur to those skilled in the art without departing from the spirit and scope thereof.

We claim:

1. Process for the separation of olefin oxides from a crude mixture comprising olefin oxides having from 3 to 18 carbon atoms and oxygenated impurities boiling within 5° C. of said olefin oxides which comprises subjecting said crude mixture to extractive distillation using an extractive solvent selected from the group of hydrocarbons consisting of olefins, naphthenes, aromatics and mixtures thereof, said hydrocarbons having a boiling point of at least 35° C. higher than that of any of said oxygenated impurities, removing said oxygenated impurities overhead while removing said extractive solvent containing said olefin oxide as bottoms.

2. Process according to claim 1 wherein said olefin oxide is stripped from said bottoms and said extractive solvent is recycled for continuous use in said extractive distillation.

3. Process for the separation of propylene oxide from a crude mixture containing propylene oxide and oxygenated impurities boiling within 5° C. of said propylene oxide which comprises subjecting said crude mixture to extractive distillation using an extractive solvent selected from the group of hydrocarbons consisting of olefins, naphthenes, aromatics and mixtures thereof, said hydrocarbons having a boiling point of at least 35° C. higher than that of any of said oxygenated impurities, removing said said oxygenated impurities overhead while removing said extractive solvent containing said propylene oxide as bottoms.

4. Process according to claim 3 wherein said crude mixture containing propylene oxide is free of methylal.

5. Process for the separation of propylene oxide from a crude mixture containing propylene oxide and methyl formate which comprises subjecting said crude mixture to extractive distillation using an extractive solvent selected from the group of hydrocarbons consisting of olefins, naphthenes, aromatics and mixtures thereof, said hydrocarbons having a boiling point of at least 35° C. higher than that of said methyl formate, removing said methyl formate overhead while removing said extractive solvent containing said propylene oxide as bottoms, stripping said propylene oxide from said extractive solvent and recycling said extractive solvent for continuous use in said extractive distillation.

6. Process according to claim 5 wherein said crude mixture containing propylene oxide is free of methylal.

7. Process according to claim 6 wherein said extractive solvent is a cracked wax olefin fraction consisting essentially of a mixture of $C_7$ and $C_8$ olefins boiling within the range of from 75° C. to 95° C.

8. Process according to claim 6 wherein said extractive solvent is 1-heptene.

9. Process according to claim 1 wherein said olefin oxides contain from 3 to 8 carbon atoms and said extractive solvent contains up to 18 carbon atoms.

10. Process according to claim 9 wherein said olefin oxide is butadiene oxide.

11. Process according to claim 9 wherein said olefin oxide is styrene oxide.

References Cited

UNITED STATES PATENTS

| | | | |
|---|---|---|---|
| 2,903,465 | 9/1959 | Suter et al. | 203—69 |
| 3,039,940 | 6/1962 | Prinz et al. | 203—70 |

NORMAN YUDKOFF, *Primary Examiner.*

WILBUR L. BASCOMB, *Examiner.*